(12) United States Patent
Murata

(10) Patent No.: US 7,975,789 B2
(45) Date of Patent: Jul. 12, 2011

(54) WHEEL ASSEMBLY WITH IN-WHEEL MOTOR

(75) Inventor: Satoshi Murata, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 520 days.

(21) Appl. No.: 12/097,290

(22) PCT Filed: Aug. 10, 2007

(86) PCT No.: PCT/IB2007/002309
§ 371 (c)(1),
(2), (4) Date: Jun. 13, 2008

(87) PCT Pub. No.: WO2008/017945
PCT Pub. Date: Feb. 14, 2008

(65) Prior Publication Data
US 2008/0308330 A1 Dec. 18, 2008

(30) Foreign Application Priority Data

Aug. 11, 2006 (JP) ................................. 2006-219761

(51) Int. Cl.
*B60K 7/00* (2006.01)
(52) U.S. Cl. .................................... 180/65.51; 180/65.6
(58) Field of Classification Search ................ 180/65.1, 180/65.51, 65.6, 65.7; 310/83
See application file for complete search history.

(56) References Cited

U.S. PATENT DOCUMENTS

| | | | | |
|---|---|---|---|---|
| 5,156,579 A | * | 10/1992 | Wakuta et al. | 475/161 |
| 5,180,180 A | * | 1/1993 | Yamashita et al. | 180/253 |
| 5,382,854 A | | 1/1995 | Kawamoto et al. | |
| 6,006,870 A | * | 12/1999 | Gazyakan et al. | 188/72.1 |
| 6,100,615 A | * | 8/2000 | Birkestrand | 310/75 C |
| 7,059,443 B2 | * | 6/2006 | Kira | 180/243 |
| 2004/0112657 A1 | * | 6/2004 | Ajiro et al. | 180/65.5 |
| 2005/0061565 A1 | * | 3/2005 | Mizutani et al. | 180/65.5 |
| 2005/0236198 A1 | * | 10/2005 | Jenkins | 180/65.5 |
| 2006/0137926 A1 | | 6/2006 | Taniguchi et al. | |
| 2006/0144626 A1 | | 7/2006 | Mizutani et al. | |
| 2007/0209852 A1 | * | 9/2007 | Kamiya | 180/65.5 |

FOREIGN PATENT DOCUMENTS

| | | |
|---|---|---|
| EP | 0 337 032 | * 10/1989 |
| JP | 2004 32914 | 1/2004 |
| JP | 2004 90822 | 3/2004 |
| JP | 2004 168211 | 6/2004 |
| JP | 2005 73364 | 3/2005 |
| JP | 2005-126037 | 5/2005 |
| JP | 2005 335623 | 12/2005 |
| JP | 2006-57732 | 3/2006 |
| JP | 2006-062388 | 3/2006 |
| WO | 2005 030509 | 4/2005 |

* cited by examiner

*Primary Examiner* — Frank B Vanaman

(74) *Attorney, Agent, or Firm* — Oblon, Spivak, McClelland, Maier & Neustadt, L.L.P.

(57) ABSTRACT

A wheel assembly with an in-wheel motor includes a motor for driving a wheel, which is arranged in the wheel; a reduction mechanism that reduces the rate of rotational output of the motor and transmits the resultant rotational output to the wheel; an oil tank in which oil collects; an oil pump that is driven by rotational output of the motor; and an oil flow path that leads oil from the oil pump to at least one of the motor and the reduction mechanism. The oil tank is arranged below the reduction mechanism, farther toward a vehicle inside in a vehicle width direction than a brake dust cover, and farther toward the vehicle outside in the vehicle width direction than a lower ball joint.

20 Claims, 6 Drawing Sheets

F I G. 2
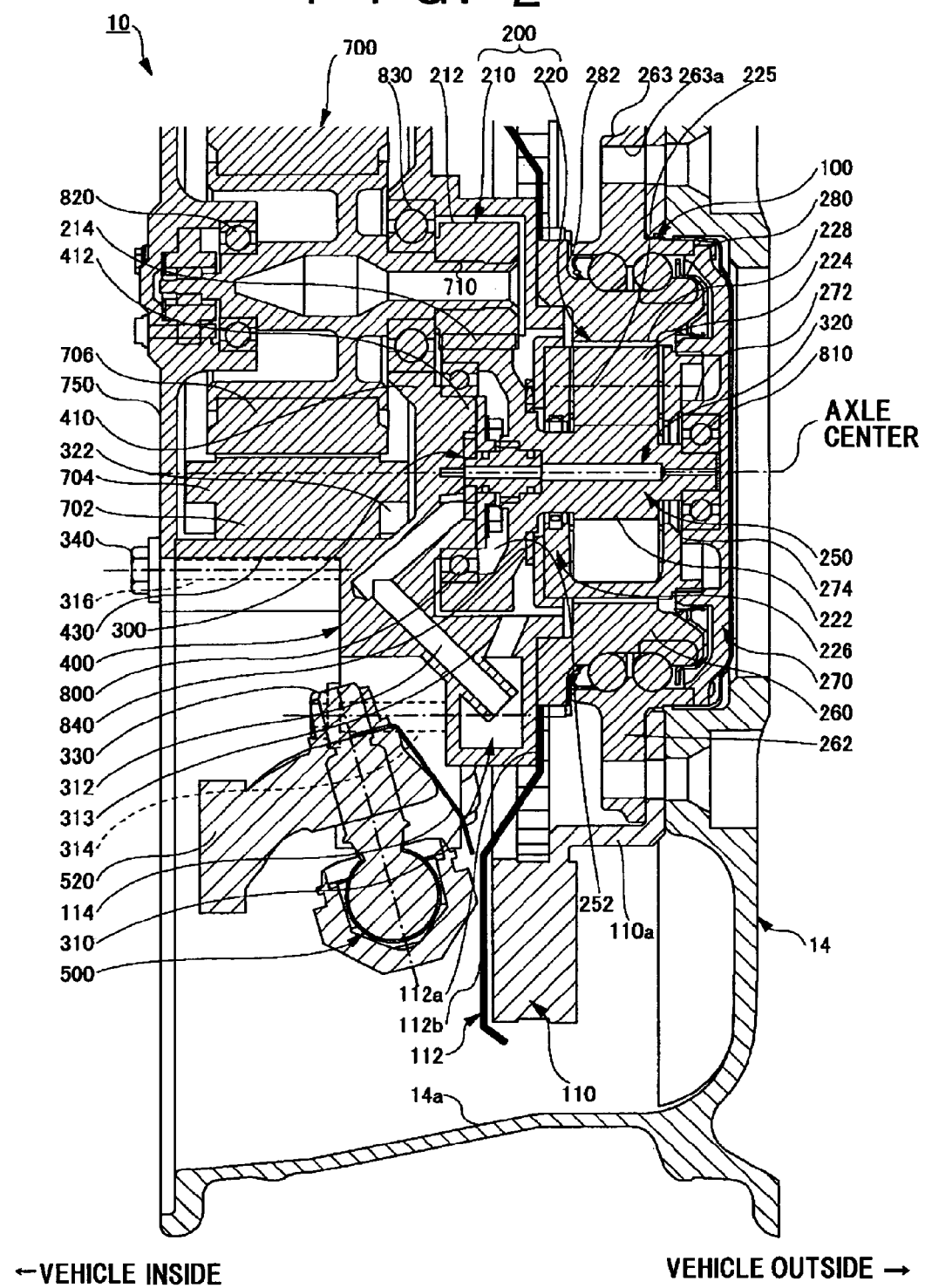
← VEHICLE INSIDE　　　　VEHICLE OUTSIDE →

F I G. 6
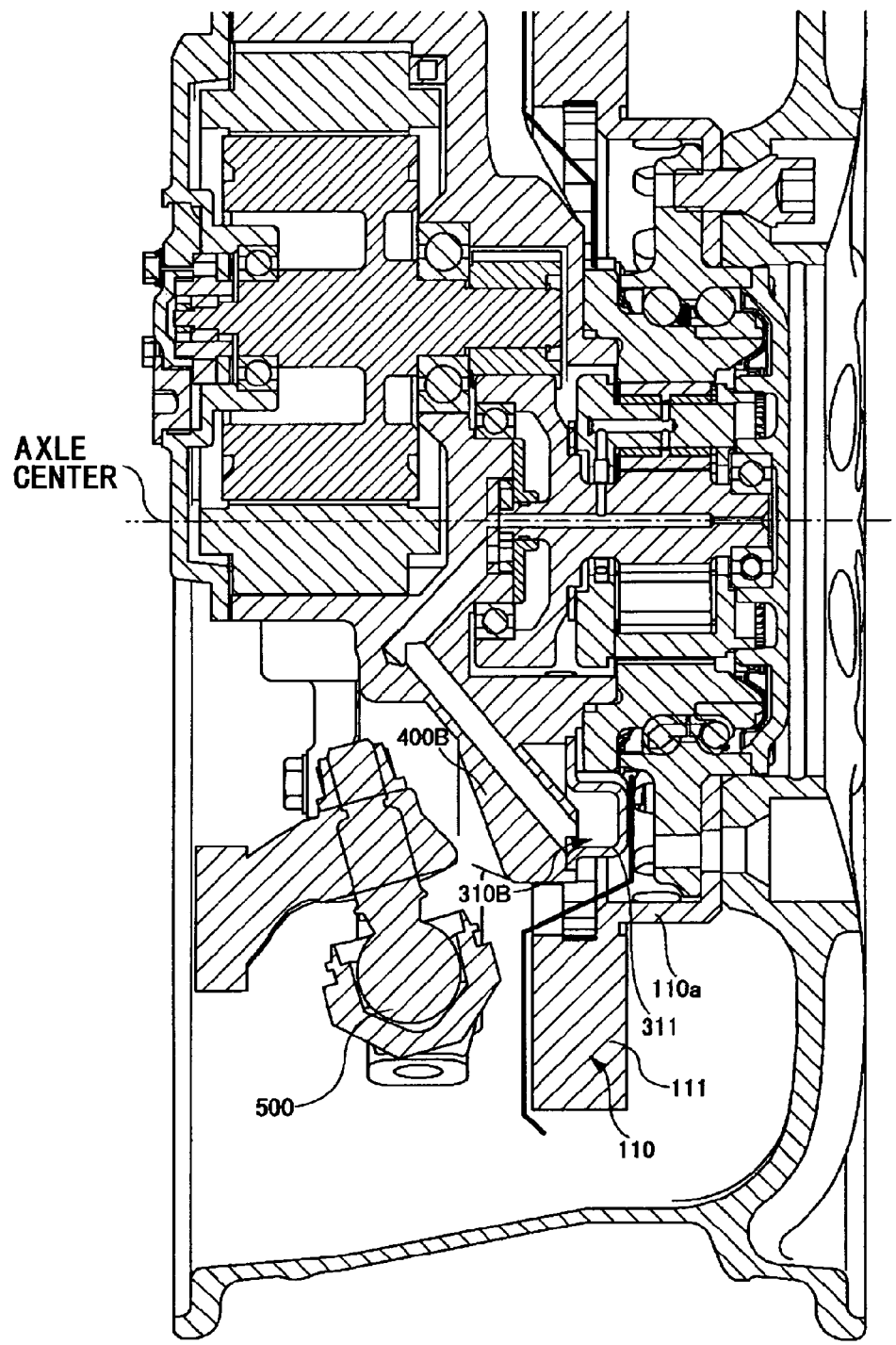
←VEHICLE INSIDE       VEHICLE OUTSIDE→

WHEEL ASSEMBLY WITH IN-WHEEL MOTOR

BACKGROUND OF THE INVENTION

1. Field of the Invention

The invention relates to a wheel assembly with an in-wheel motor in which a motor for driving a wheel is arranged within the wheel.

2. Description of the Related Art

Japanese Patent Application Publication No. JP-A-2005-335623, for example, describes a related wheel assembly with an in-wheel motor in which oil is supplied for cooling the motor and lubricating a reduction mechanism. In the invention described in Japanese Patent Application Publication No. JP-A-2005-335623, an oil tank is arranged farther toward a vehicle outside than a lower ball joint.

In the foregoing wheel assembly with an in-wheel motor, the limited space within the wheel must be used to house the motor, the reduction mechanism, an oil pump, the oil tank, and an oil circulation passage. The arrangement of these main constituent elements is preferably such that they do not restrict the design of the suspension. That is, by arranging these main constituent elements as close to the vehicle outside as possible within the wheel, the weight of the knuckle and the like can be reduced and ample space is left on the vehicle inside within the wheel for the design of the suspension.

With respect to this, in the invention described in Japanese Patent Application Publication No. JP-A-2005-335623 above, the oil tank is arranged farther toward the vehicle inside than the lower ball joint, which greatly restricts the design of the suspension.

On the other hand, a structure in which the oil tank is arranged farther toward the vehicle outside than the lower ball joint is advantageous in terms of the degree of freedom it offers with respect to the design of the suspension. However, there is not much space due to the relationship with the brake disc so the arrangement itself is difficult. Also, even if the arrangement is possible, oil that drips from the oil tank in the unlikely event of an oil leak or when the oil is being changed may drip onto the brake disc and reduce its performance.

SUMMARY OF THE INVENTION

This invention thus provides a wheel assembly with an in-wheel motor in which an oil tank is arranged in a suitable position.

First aspect of the invention relates to a wheel assembly with an in-wheel motor, which is includes a motor for driving a wheel and which is arranged in the wheel; a reduction mechanism which reduces the rate of rotational output of the motor and transmits the resultant rotational output to the wheel; an oil tank in which oil collects; an oil pump that is driven by rotational output of the motor; and an oil flow path that leads oil from the oil pump to at least one of the motor and the reduction mechanism. The oil tank is arranged below the reduction mechanism, farther toward a vehicle inside in a vehicle width direction than a brake dust cover that covers a brake disc from the vehicle inside, and farther toward a vehicle outside in the vehicle width direction than a lower ball joint. Accordingly, oil in the oil tank is prevented from becoming rotational resistance against the gears of the reduction mechanism. Moreover, in the unlikely event that oil was to leak from the oil tank, the leaked oil is prevented from getting on the lower ball joint and the brake disc.

In the wheel assembly with an in-wheel motor according to the first aspect, a drain plug of the oil tank may be arranged offset in a vehicle longitudinal direction with respect to the lower ball joint. Accordingly, in the unlikely event that oil was to leak from the oil tank, the leaked oil is prevented from getting on the lower ball joint.

In the foregoing wheel assembly with an in-wheel motor, a drain flow path for oil may be formed which has an opening in the position where the lower ball joint fastens to the knuckle, and a drain plug of the oil tank may also serve to fasten the lower ball joint to the knuckle. As a result, the number of parts can be reduced.

In the foregoing wheel assembly with an in-wheel motor, the drain plug of the oil tank may be arranged farther toward the vehicle inside than the brake dust cover. As a result, even if oil leaks during an oil change or the like, the leaked oil can be prevented from getting onto the brake disc.

In the foregoing wheel assembly with an in-wheel motor, the drain plug of the oil tank may be provided at the lowest position of the oil tank when a suspension is unweighted. Accordingly, the oil in the oil tank can be efficiently and easily drained during an oil change.

In the foregoing wheel assembly with an in-wheel motor, a filler plug of the oil tank may be arranged farther toward the vehicle inside than the lower ball joint. Accordingly, any oil that leaks when the oil tank is being filled with oil can be prevented from getting onto the lower ball joint.

In the foregoing wheel assembly with an in-wheel motor, the oil tank may be arranged inside a hat portion of the brake disc. Accordingly, even if the oil tank is arranged farther toward the vehicle outside than the lower ball joint, as described above, the oil tank can still be efficiently arranged without interfering with the brake disc.

According to the invention, a wheel assembly with an in-wheel motor in which an oil tank is arranged in a suitable position is able to be obtained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a sectional view of the wheel assembly with an in-wheel motor taken along line II-II in FIG. 1;

FIG. 6 is a sectional view of a wheel assembly with an in-wheel motor according to a modified example of the first example embodiment.

DETAILED DESCRIPTION OF THE PREFERRED EMBODIMENTS

In the following description and the accompanying drawings, the present invention will be described in more detail in terms of example embodiments.

Figure 1:
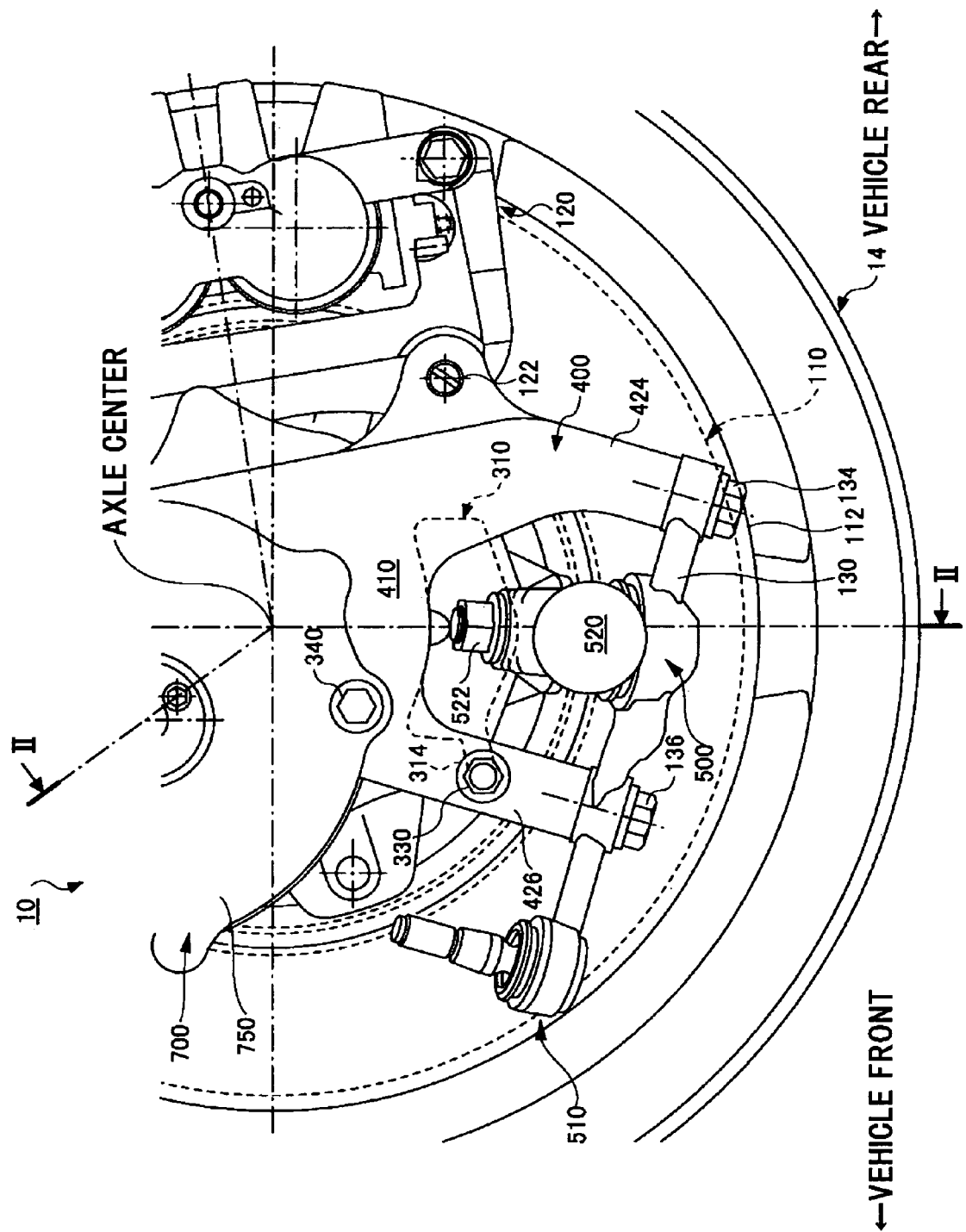
FIG. 1 is a view of a wheel assembly with an in-wheel motor according to one example embodiment as viewed from the vehicle inside.
Figure 3:
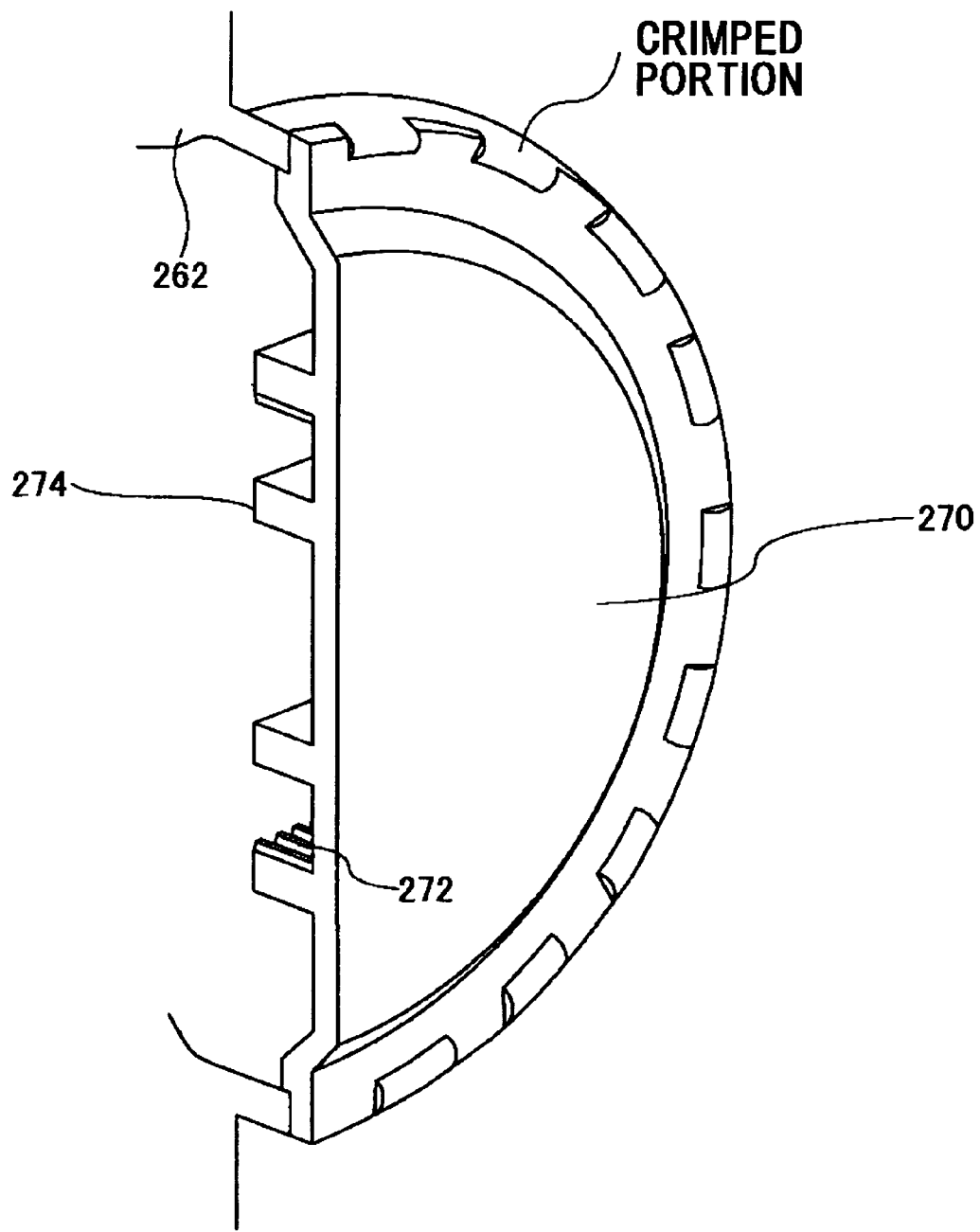
FIG. 3 is a perspective view of an example of a method for connecting an outer race side member to a power transmitting member.

FIGS. 1 and 2 are views of a wheel assembly with an in-wheel motor (the term "in-wheel motor" in this specification refers to a motor that is housed within a wheel) according to one example embodiment of the invention. FIG. 1 is a view of the wheel assembly from the vehicle inside and FIG. 2 is a sectional view taken along line II-II in FIG. 1. FIG. 3 is a perspective view of an example of a method for connecting an outer race side member 262 to a power transmitting member 270. In FIG. 1, the left side of the drawing corresponds to the front side of the vehicle. In FIGS. 1 and 2, the tire, as well as the upper ⅓ or so of the wheel, is omitted.

Tire/wheel assembly 10 includes a wheel 14 to which a tire, not shown, is mounted. As will be described in detail later, the main portions of the constituent elements related to the motor are housed in a space enclosed by a rim inner peripheral surface 14a of the wheel 14. In the following description, the words "inside of the tire/wheel assembly" refer to the generally columnar space that is enclosed by the rim inner peripheral surface 14a of the wheel 14. However, expressions such as "a part is arranged inside the tire/wheel assembly" do not always mean that the entire part is housed completely within this generally columnar space. They also include structures in which a portion of the part partially protrudes from within that generally columnar space.

Arranged within the tire/wheel assembly 10 are mainly an axle bearing 100, a brake disc 110, a brake dust cover 112 that covers the brake disc 110 from the inner side of the vehicle in the vehicle width direction (hereinafter also referred to simply as "vehicle inside"), a brake caliper 120, a motor 700 for driving the wheel, a reduction mechanism 200, an oil pump 300, an oil tank 310, an oil flow path 320 (only part of which is shown), a knuckle (i.e., a carrier) 400, a lower ball joint 500 that is connected to a wheel-side end portion of a lower arm 520, and a ball joint 510 that is connected to a wheel-side end portion of a tie rod, not shown, (hereinafter referred to as "tie rod B/J 510"). Also, although not shown, an upper ball joint that is connected to the wheel-side end portion of an upper arm is also arranged in the tire/wheel assembly 10. However, when strut type suspension is used, the lower end of the strut (i.e., shock absorber), instead of the upper arm, is connected to the upper side of the knuckle 400.

The motor 700 is arranged in a space on the vehicle inside within the tire/wheel assembly 10. The motor 700 is arranged offset upward, in the height direction of the vehicle, as shown in FIG. 2, and forward, in the longitudinal direction of the vehicle, as shown in FIG. 1, with respect to the axle center. Accordingly, a space not occupied by the motor 700, which corresponds to the amount that the motor 700 is offset, is created to the lower rear on the vehicle inside within the tire/wheel assembly 10, as shown in FIG. 1. Therefore, the lower space on the vehicle inside within the tire/wheel assembly 10 is larger than it is with a structure in which the motor is arranged on the same axis as the axle center. As a result, there is a larger degree of freedom for arranging the suspension on the lower side. Also, the brake caliper 120 can easily be housed on the side (i.e., the vehicle rear side in this example) opposite the side (i.e., the vehicle front side) to which the motor 700 is offset within the tire/wheel assembly 10, as shown in FIG. 1.

The motor 700 includes a stator core 702, a stator coil 704, and a rotor 706. If the motor 700 is a three phase motor, the stator coil 704 may include a U phase coil, a V phase coil, and a W phase coil. The rotor 706 is arranged on the inner peripheral sides of the stator core 702 and the stator coil 704.

The rotor 706 of the motor 700 has an output shaft 710, the rotational center of which is offset with respect to the axle center, as described above. The output shaft 710 is rotatably supported by a motor cover 750 via a bearing 820 on the vehicle inside in the tire/wheel assembly 10, as well as rotatably supported by the knuckle 400 (main structure portion 410) via a bearing 830 on the outer side of the vehicle in the vehicle width direction (hereinafter also referred to simply as "vehicle outside") in the tire/wheel assembly 10. The bearings 820 and 830 may be radial ball bearings which use balls as rolling bodies, such as single-row, deep-grooved ball bearings, for example.

The rotational output of the motor 700 is transmitted to the wheel 14 via the reduction mechanism 200. The reduction mechanism 200 is a twin shaft reduction mechanism which includes a counter gear mechanism 210 and a planetary gear set 220. Thus the reduction mechanism 200 realizes a two step reduction. Gears 212, 214, 222, 224, 226, and 228 of the reduction mechanism 200, which will be described below, may be helical gears.

As shown in FIG. 2, the counter gear mechanism 210 is arranged farther to the vehicle outside than the motor 700. The counter gear mechanism 210 includes a small diameter driving gear 212 which is arranged on the output shaft 710 of the motor 700, and a large diameter counter gear 214 that is in mesh with the driving gear 212. The small diameter driving gear 212 is spline fitted to the output shaft 710 of the motor 700 from the vehicle outside, and thus integrated with the output shaft 710. The large diameter counter gear 214 is formed with the axle center as its rotational center. Thus, the output shaft 710 of the motor 700 is arranged offset with respect to the axle center by approximately the distance of the combined radii of the driving gear 212 and the counter gear 214.

As shown in FIG. 2, the planetary gear set 220 is arranged farther to the vehicle outside than the counter gear mechanism 210 within the tire/wheel assembly 10. The planetary gear set 220 is arranged on the same axis as the axle center, and includes a sun gear 222, a planetary gear 224, a planetary carrier 226, and a ring gear 228.

The sun gear 222 is connected to the counter gear 214 of the counter gear mechanism 210. In the example shown in FIG. 2, the sun gear 222 is formed on one end side of a shaft (i.e., sun gear shaft) 250 and the counter gear 214 is formed on the other end side of the shaft 250 in the width direction of the vehicle. More specifically, the shaft 250 has a rotational center that is on the same axis as the axle center. The sun gear 222 is positioned on the peripheral surface of the end portion on the vehicle outside, and the counter gear 214 is positioned on the peripheral surface of the end portion on the vehicle inside. The end portion of the shaft 250 on the vehicle inside is rotatably supported by the knuckle 400 via a bearing 800, and the end portion of the shaft 250 on the vehicle outside is rotatably supported by a disc-shaped power transmitting member 270 via a bearing 810. The sun gear 222 and the counter gear 214 may also be formed as separate parts, in which case they may be connected using splines. Also, the bearings 800 and 810 may be radial ball bearings which use balls as rolling bodies, such as single-row, deep-grooved ball bearings, for example. Further, as shown in FIG. 2, the bearing 800 may be incorporated inside (i.e., on the inner peripheral side of) the counter gear 214, and a convex portion 412 of the knuckle 400 connected by press-fitting or the like to the inner race side of the bearing 800.

The planetary gear 224 is in mesh with the sun gear 222 on the inner peripheral side and in mesh with the ring gear 228 on the outer peripheral side. The planetary gear 224 is rotatably supported around a roller shaft 225 via a roller bearing by the planetary carrier 226. The rotational center of the planetary carrier 226 is the same as the axle center. The planetary carrier 226 is supported at the vehicle inside within the tire/wheel assembly 10 by the shaft 250 via a thrust cylindrical roller bearing 840, and is spline fitted at the vehicle outside to a circumferential groove 272 (see FIG. 3) formed circumferentially in the power transmitting member 270. A plurality of the planetary gears 224 are arranged at equidistant intervals around the sun gear 222. The planetary gears 224 and the planetary carrier 226 are assembled to form a single unit (hereinafter referred to as "planetary gear unit"). The planetary carrier 226 of this planetary gear unit abuts against a stopper portion 274 of the power transmitting member 270 on the vehicle outside. Accordingly, displacement of the planetary gear unit in the width direction of the vehicle is restricted by the thrust cylindrical roller bearing 840 and the stopper portion 274.

The rotational center of the ring gear 228 is the same as the axle center. The ring gear 228 is formed on the inner peripheral surface of an inner race side member 260 that is arranged so as to surround the sun gear 222 from the outer peripheral side. The outer peripheral surface of the inner race side member 260 forms an inner race of the axle bearing 100. In the illustrated example, the axle bearing 100 is a double-row angular ball bearing. The outer inner race with respect to the row on the vehicle outside is formed of a separate member than the inner race side member 260. This kind of separate member is integrated with the inner race side member 260 by fitting it around the outer periphery of the inner race side member 260 and crimping it thereto.

An outer race side member 262 is arranged so as to surround the inner race side member 260 from the outer peripheral side. The inner peripheral surface of the outer race side member 262 forms an outer race of the axle bearing 100. Seals 280 and 282 for preventing foreign matter from getting in and oil from flowing out are provided at the end portions in the width direction of the vehicle between the outer race side member 262 and the inner race side member 260.

The power transmitting member 270 is a disc-shaped member provided so as to cover the vehicle outside of the reduction mechanism. The circumferential groove 272 to which the vehicle outside end portion (peripheral wall portion) of the planetary carrier 226 is spline fitted is formed on the vehicle inside of the power transmitting member 270. The outer peripheral edge of the power transmitting member 270 is connected to the end portion on the vehicle outside of the outer race side member 262 by crimping or the like, as shown in FIG. 3. That is, the power transmitting member 270 is fixed to the outer race side member 262 so that it blocks a generally circular opening on the vehicle outside of the outer race side member 262. The outer race side member 262 has a flange portion 263 that protrudes toward the outside in the radial direction on the outer peripheral surface. A bolt hole 263a for fastening a hub bolt, not shown, is formed in this flange portion 263. The outer race side member 262 is fastened together with the brake disc 110 by the hub bolt to the wheel 14 with the inner peripheral portion of the brake disc 110 being sandwiched between the flange portion 263 and the wheel 14.

In the foregoing structure, when the rotor 706 of the motor 700 rotates in response to a command from a vehicle control apparatus, not shown, the small diameter driving gear 212 rotates, and as it does so, the large diameter counter gear 214 that is in mesh with the driving gear 212 rotates, thus realizing a first reduction by the counter gear mechanism 210. When the counter gear 214 rotates, the sun gear 222 which is integral with the counter gear 214 also rotates. As a result, the planetary gears 224 rotate while revolving around the sun gear 222. This rotation realizes a second reduction by the planetary gear set 220. The revolving motion of the planetary gears 224 is output by the planetary carrier 226 and transmitted to the power transmitting member 270 which is spline fitted to the planetary carrier 226. The tire/wheel assembly 10 is driven as the outer race side member 262, the brake disc 110, and the wheel 14 all rotate together with the power transmitting member 270.

The knuckle 400 mainly includes a main structure portion 410 positioned near substantially the center of the tire/wheel assembly 10, and a cylindrical peripheral wall portion (i.e., a motor case portion) 430. The main constituent elements of the motor 700 described above are arranged in a space to the inside in the radial direction of the peripheral wall portion 430 of the knuckle 400. The motor cover 750 is connected to the end portion on the vehicle inside of the peripheral wall portion 430 of the knuckle 400 so as to cover the space inside the peripheral wall portion 430.

Unlike the thin peripheral wall portion 430 and other ribs and the like, the main structure portion 410 of the knuckle 400 has sufficient strength and rigidity, and therefore serves to receive loads input via the axle bearing 100, the mounting points of the tie rod and the suspension arm (i.e., lower arm 520, etc.), and the brake caliper mounting point 122.

The inner race side member 260 is connected by press-fitting or a bolt, for example, to the end portion on the vehicle outside of the main structure portion 410 of the knuckle 400. The main structure portion 410 of the knuckle 400 receives various loads input from the tire/wheel assembly 10 via the axle bearing 100 (i.e., the inner race side member 260) at the vehicle outside end portion. The counter gear mechanism 210 described above is arranged in the space inside the main structure portion 410 of the knuckle 400. The main structure portion 410 of the knuckle 400 receives various thrust loads and radial loads input via the bearing 830 and the bearing 800. The main structure portion 410 of the knuckle 400 is highly rigid so the dynamic load rating or the dynamic equivalent load of the bearings 830 and 800 is preferably set higher than it is for the corresponding bearings 820 and 810. As a result, a reasonable structure that can withstand a large load can be realized at portions with high strength and rigidity.

The main structure portion 410 of the knuckle 400 has two leg portions 424 and 426 that extend to the lower side. A knuckle arm 130 is fastened by a bolt or the like to the lower end of the each leg portion 424 and 426. The knuckle arm 130 extends in the longitudinal direction of the vehicle within the tire/wheel assembly 10. The tie rod B/J 510 is installed on the front end side of the knuckle arm 130 and the lower ball joint 500 is installed on the rear end side of the knuckle arm 130. The main structure portion 410 of the knuckle 400 receives various loads input via the lower ball joint 500 and the tie rod B/J 510.

Lower ball joint 500 is arranged between the two leg portions 424 and 426 in the longitudinal direction of the vehicle and generally in the center of the tire/wheel assembly 10 in the longitudinal direction of the vehicle, as shown in FIG. 1. Also, as shown in FIG. 2, the lower ball joint 500 is arranged farther toward the vehicle inside than the brake disc 110. The lower arm 520 is fastened to the lower ball joint 500 by a nut 522 from above. The lower arm 520 extends in the width direction of the vehicle and the vehicle inside end portion is supported by a vehicle body, not shown, via a bush and the like. The lower arm 520 may be any type. For example, it may be an L-shaped lower arm or a double ring type lower arm. The lower arm 520 works in cooperation with the upper arm (or strut), not shown, to pivotally support the tire/wheel assembly 10 with respect to the vehicle body. Also, a spring and an absorber, not shown, are provided between the vehicle body and the lower arm 520. As a result, input from the tire/wheel assembly 10 to the vehicle body is reduced. The spring may be any type of spring coil or air spring. Also, the absorber may not only be a hydraulic absorber that applies damping action to vertical input, but also a rotary electromagnetic absorber that applies damping action to rotational input.

In this example embodiment, the motor 700 is offset upward with respect to the axle center, as described above. This increases the degree of freedom in the arrangement/position of the lower ball joint 500 (i.e. in the arrangement of the kingpin axis). For example, the lower ball joint 500 can also be moved as close to the brake disc 110 as possible, leaving only the necessary clearance, as shown in FIG. 2. As a result, the amount of offset of each member and the tire input point in the width direction of the vehicle is reduced, thereby enabling the necessary strength and rigidity of the members (such as the main structure portion 410 of the knuckle) to be reduced, which reduces weight.

As shown in FIG. 1, the tie rod B/J 510 is arranged farther to the front than the front leg portion 426 in the longitudinal direction of the vehicle. The tie rod B/J 510 is also arranged farther to the vehicle inside than the brake disc 110. A tie rod, not shown, is fastened to the tie rod B/J 510 by a nut, not shown, from above. The tie rod extends in the width direction of the vehicle and the vehicle inside end portion is connected to a rack shaft, not shown, which is connected to a steering shaft by a rack and pinion mechanism, for example, thus enabling the tire/wheel assembly 10 to be steered. In this way, according to this example embodiment, the motor 700 is offset above the axle center, as described above, which makes it easy to fit the tie rod B/J 510 inside the tire/wheel assembly 10.

As shown in FIG. 1, mounting points 122 (only one point is shown in the drawing) for the brake caliper 120 arranged on the vehicle rear side with respect to the motor 700 are installed on the main structure portion 410 of the knuckle 400. The main structure portion 410 of the knuckle 400 receives the loads input during braking via the mounting points 122 for the brake caliper 120. In the example shown in the drawing, the lower mounting point 122 of the brake caliper 120 is set near the base of the leg portion 424 to the vehicle rear of the knuckle 400. Making this kind of extremely strong and rigid portion a mounting portion for the brake caliper 120 enables a reasonable structure to be achieved.

The oil pump 300 is arranged between the motor 700 and the planetary gear set 220 of the reduction mechanism 200 in the width direction of the vehicle. More specifically, the oil pump 300 is provided on the vehicle inside end portion of the shaft 250. In the example shown in FIG. 2, the oil pump 300 is arranged inside the counter gear 214 of the counter gear mechanism 210, i.e., to the inside of the counter gear 214 in the radial direction. In other words, the convex portion 412 that forms part of the main structure portion 410 of the knuckle 400 is accommodated within a cavity 252 formed in the vehicle inside end portion (i.e., a portion with a larger diameter) of the shaft 250. A concave portion is formed to the inside of the convex portion 412 in the radial direction. The oil pump 300 is provided in this concave portion. The oil pump 300 may not only be a trochoid pump as shown in the drawings, but any one of a variety of gear pumps such as an external gear pump or an internal gear pump (with or without a crescent-shaped partition), or another type of hydraulic pump such as a vane pump, for example.

The oil pump 300 is driven by rotational output of the motor 700. More specifically, the inner rotor of the oil pump 300 is connected to the vehicle inside end portion of the shaft 250, and thus rotates when the shaft 250 rotates. That is, the inner rotor of the oil pump 300 is driven by the same shaft that the counter gear 214 is provided on. When the inner rotor rotates, oil in the oil tank (i.e., oil reservoir) 310 is drawn up via a suction path 312. The oil that is drawn in through an inlet, not shown, is then caught between the inner and outer rotors of the oil pump 300 and discharged from an outlet, not shown, to the oil flow path 320.

In this example embodiment, as described above, the oil pump 300 is driven by rotational output of the counter gear 214. Therefore, the oil pump 300 is driven at a speed that is slower than the speed of the motor 700 by the amount corresponding to the speed reduction from the counter gear mechanism 210. As a result, the fastest rotation speed of the oil pump 300 is less than it is when the oil pump 300 is driven by the output shaft 710 of the motor 700, which improves the durability of the oil pump 300.

Also, in this example embodiment, as described above, the oil pump 300 is set inside the shaft 250 (i.e., inside the counter gear 214) and arranged in substantially the same area as the counter gear mechanism 210 in the width direction of the vehicle. Therefore, the length in the axial direction necessary to arrange the motor 700, the oil pump 300, and the reduction mechanism 200 can be shortened by the amount of the oil pump 300 compared to when the motor, oil pump, and reduction mechanism are arranged in series.

Also, as described above, in this example embodiment, the oil pump 300 is arranged between the motor 700 and the planetary gear set 220 of the reduction mechanism 200. Therefore, it is easy to the arrange oil flow path 320 for cooling the motor 700 or lubricating the reduction mechanism 200 and the various bearings (such as the bearings 800, 810, 820, and 830). While the path of the oil flow path 320 will not be described in detail here, the oil in the oil flow path 320 formed inside the shaft 250 is supplied to the bearing 810, and supplied to the planetary gears 224 via oil holes, not shown, by centrifugal force generated as the shaft 250 rotates, for example. The oil supplied in this way is used to lubricate the bearing 810 as well as the roller bearings which are at the rotational centers of the planetary gears 224. Further, the oil from the oil pump 300 is used to cool the stator coil 704 and lubricate the bearings 800, 820, and 830 via the oil flow path 320 (which is not shown in the cross section in FIG. 2) formed using the space 322 near the coil end of the stator coil 704. The oil used for cooling or lubrication as described above is then finally returned to the oil tank 310 by gravity.

Next, based on the foregoing structure, the arrangements of the oil tank 310, a drain plug 330, and a filler plug 340 will now be described in that order as the characteristic structure of this example embodiment.

[Arrangement of the oil tank 310] The oil tank 310 is formed below the knuckle 400, as shown in FIG. 2. The lower end portion of the suction path 312 formed in the knuckle 400, as well as an oil return path 313 for returning oil, is connected to the oil tank 310. As described above, the oil tank 310 serves to collect oil for cooling the motor 700 and lubricating the reduction mechanism 200.

In order to both facilitate the return of oil used for cooling and lubrication to the oil tank 310 and prevent the oil collected in the oil tank 310 from becoming rotational resistance against the gears of the reduction mechanism 200, the oil tank 310 is preferably provided in a position lower than the lowest position of the motor 700 and the reduction mechanism 200.

On the other hand, if the oil tank 310 is provided in a position that is lower than the lowest position of the motor 700 and the reduction gears 200, it tends to restrict the arrangement of the lower arm 520 and the lower ball joint 500 on the vehicle inside within the tire/wheel assembly 10, and restrict the arrangement of the brake disc 110 on the vehicle outside within the tire/wheel assembly 10. That is, if the oil tank 310 were to be arranged near the area directly above the lower ball joint 500 and oil were to leak from the oil tank 310 due to the oil tank 310 being damaged or the like, it may reduce the performance of the lower ball joint 500. Also, if the oil tank were arranged farther to the vehicle inside than the lower ball joint 500, it would impair the degree of freedom with respect to the suspension design, as can be understood from FIG. 1 as well. Moreover, if the oil tank 310 were arranged farther toward the vehicle outside than the lower ball joint 500 at approximately the same height as the lower ball joint 500, it would be difficult to arrange it so that it would not interfere with the brake disc 110. Also, in the unlikely event that oil were to leak from the oil tank 310 due to the oil tank 310 being damaged or the like and that oil were to get onto the brake disc 110, it may reduce the performance of the brake disc 110.

Therefore, in this example embodiment, as shown in FIGS. 1 and 2, the oil tank 310 is arranged in a position lower than the lowest position of the motor 700 and the reduction mechanism 200, and below, along a vertical line that is orthogonal to, the axle center in the tire/wheel assembly 10. Also, the oil tank 310 is arranged farther to the vehicle outside than the lower ball joint 500 and farther to the vehicle inside than the brake dust cover 112, as well as on the inner radial side of a hat portion 110*a*, as shown in FIG. 2.

Accordingly, by arranging the oil tank 310 in a position lower than the lowest position of the motor 700 and the reduction mechanism 200 (and the oil flow path 320 for cooling and lubricating), it is possible to ensure the return of oil used for cooling or lubrication and prevent the oil collected in the oil tank 310 from becoming rotational resistance against the various gears (such as the counter gear 214) of the reduction mechanism 200.

Also, arranging the oil tank 310 farther to the outside than the lower ball joint 500 makes it possible to ensure the necessary degree of freedom for the suspension design. Also, even if oil were to leak from the oil tank 310 due to the oil tank 310 being damaged or the like the leaked oil would be reliably prevented from getting onto the lower ball joint 500, thus reliably preventing a decline in performance of the lower ball joint 500. Moreover, a cover 114 may also be provided to cover the lower ball joint 500 from above, as shown in FIG. 2, in order to more reliably prevent leaked oil from getting onto the lower ball joint 500. In this case, the cover 114 may be structured so that it is also fastened to the upper portion of the lower ball joint 500 by the nut 522 for attaching the lower arm 520.

Further, by arranging the oil tank 310 farther to the vehicle inside than the brake dust cover 112, even in the unlikely event that oil does leak from the oil tank 310, the leaked oil would be prevented from getting onto the brake disc 110 by the brake dust cover 112, thereby preventing a decline in performance of the brake disc 110.

Also, in this example embodiment, the oil tank 310 is arranged in the space inside the hat 110*a* of the brake disc 110, as shown in FIG. 2. That is, the oil tank 310 is arranged between the lower ball joint 500 and the vehicle inside end portion of the inner race side member 260 in the vehicle width direction, and farther to the inside than an outer peripheral portion (i.e., the portion sandwiched between brake pads) of the brake disc 110 in the radial direction. As a result, even in the limited space farther to the vehicle outside than the lower ball joint 500 within the tire/wheel assembly 10, the oil tank 310 can still be efficiently arranged without interfering with the brake disc 110. Also, by arranging the oil tank 310 in this position, in combination with the position in which the oil pump 300 is arranged which is described above, the suction path 312 from the oil tank 310 to the oil pump 300 can be provided along an efficient path, as shown in FIG. 2.

The brake dust cover 112 itself may be formed of resin or the like, similar to an ordinary brake dust cover. As shown in FIG. 1, the brake dust cover 112 is disc-shaped and has a larger diameter than the diameter of the brake disc 110. The brake dust cover 112 is attached by bolts or the like to the inner race side member 260 or the knuckle 400, for example. From a sectional view, the brake dust cover 112 has an inner peripheral portion 112*a* that is positioned farther to the vehicle outside than the portion of the oil tank 310 that is farthest to the vehicle outside, and an outer peripheral portion 112*b* that continues on from the inner peripheral portion 112*a*, extending radially outward and facing the outer peripheral portion of the brake disc 110, as shown in FIG. 2. Accordingly, the area that is farther to the vehicle outside than the oil tank 310 is completely blocked off by the brake dust cover 112 so that even in the unlikely event that oil were to leak from the oil tank 310, that leaked oil can be reliably prevented from getting onto the brake disc 110 by the brake dust cover 112.

[Arrangement of the drain plug 330] The drain plug 330 is a removable plug that blocks the opening of a drain flow path 314 of the oil tank 310, and can be removed when draining used oil from inside the oil tank 310, such as when changing the oil, for example. The drain flow path 314 is formed so that it is connected to the oil tank 310 inside the knuckle 400. Also, the drain flow path 314 has an opening on the vehicle inside surface of the knuckle 400. The drain plug 330 which is liquid-tight is attached to the opening.

The drain plug 330 is arranged offset toward the front of the vehicle with respect to the lower ball joint 500, as shown in FIG. 1. Accordingly, even if oil leaks when the drain plug 330 is out while the oil is being changed, the leaked oil can still be prevented from getting onto the lower ball joint 500. Also, as shown in FIG. 2, the drain plug 330 is arranged farther toward the vehicle inside than the brake dust cover 112. Accordingly, even if oil leaks when the drain plug 330 is out while the oil is being changed, the leaked oil can similarly still be prevented from getting onto the brake disc 110. Further, as shown in FIG. 1, the drain plug 330 is arranged offset toward the vehicle rear with respect to the tie rod B/J 510. Therefore, in this case as well, even if oil leaks when the drain plug 330 is out while the oil is being changed, the leaked oil can still be prevented from getting onto the tie rod B/J 510.

In this example embodiment, the drain plug 330 is not arranged offset in the vehicle width direction with the respect to the lower ball joint 500, as shown in FIG. 2. However, as described above, the drain plug 330 is offset toward the front of the vehicle with respect to the lower ball joint 500 so even if oil were to leak, it would not get onto the lower ball joint 500. However, in this example embodiment, by arranging the drain plug 330 farther toward the vehicle inside than the lower ball joint 500, the drain plug 330 can be offset in both the vehicle longitudinal and width directions with respect to the lower ball joint 500, similar to the filler plug 340 which will be described later.

Figure 4:
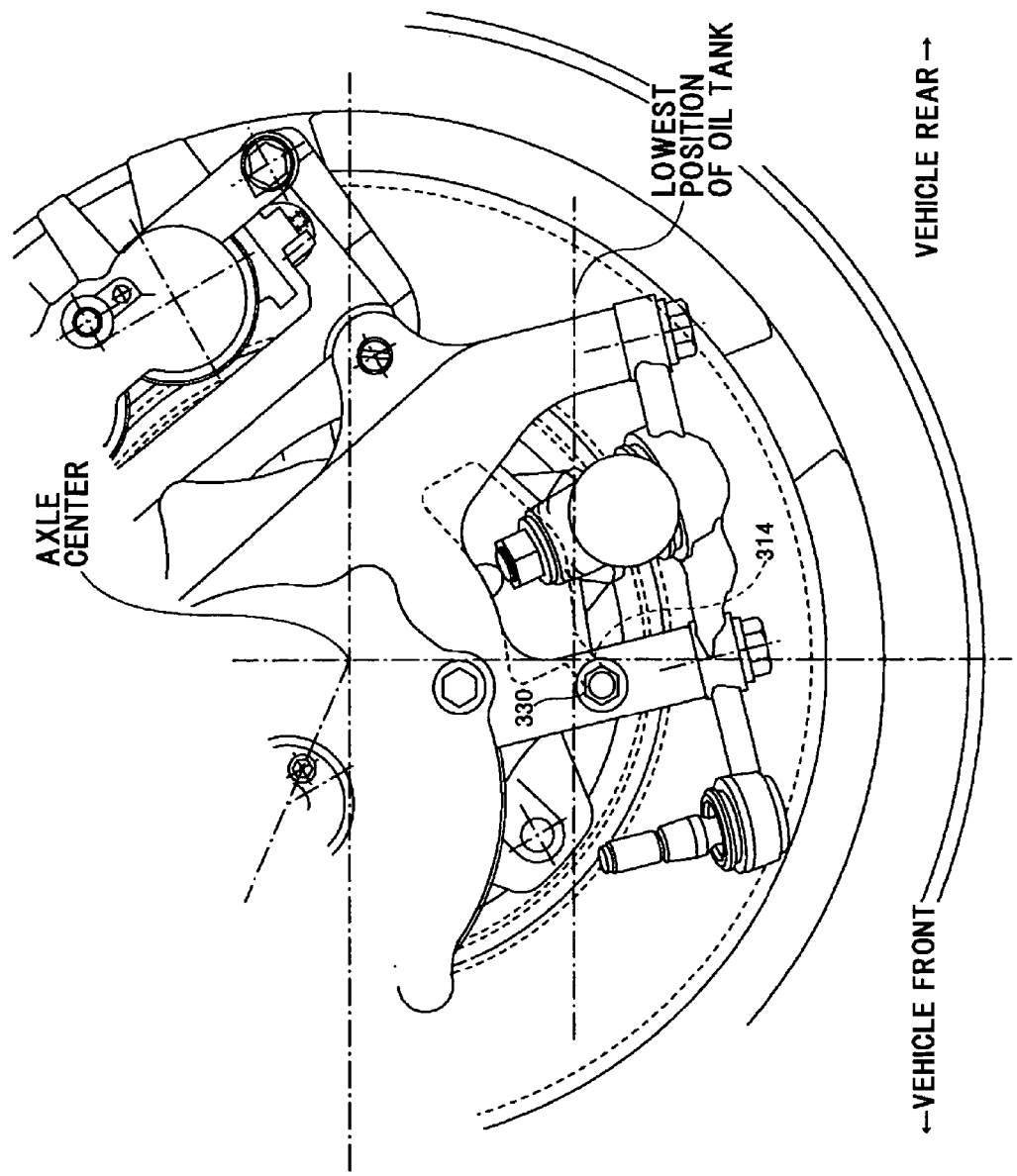
FIG. 4 is a view of an example of the state of a tire/wheel assembly when it is unweighted (i.e., when the spring of the suspension is extended)

FIG. 4 is a view of an example of the state of the tire/wheel assembly 10 when it is unweighted (i.e., when the spring of the suspension is extended).

The oil changes are often performed in a pit, for example, while the vehicle body is lifted up so that the tire/wheel assembly 10 is off of the ground. That is, oil changes are often done when the tire/wheel assembly 10 is unweighted. Based on this, the drain plug 330 of the oil tank 310 in this example embodiment is provided either in the lowest position in the oil tank 310 (including the drain flow path 314) or in a position even lower while the suspension is unweighted. Accordingly, all of the oil to be drained can be drained efficiently and easily in the pit. From the same viewpoint, the drain flow path 314 is provided extending downward from the lowest position of the main portion of the oil tank 310 when the suspension is unweighted. That is, in this example, taking into account the fact that the vehicle front side of the main portion of the oil tank 310 is lower than the vehicle rear side of the main portion of the oil tank 310 when the suspension is unweighted, the drain flow path 314 is formed extending downward from the front end side of the oil tank 310 when viewed from the side.

Figure 5:
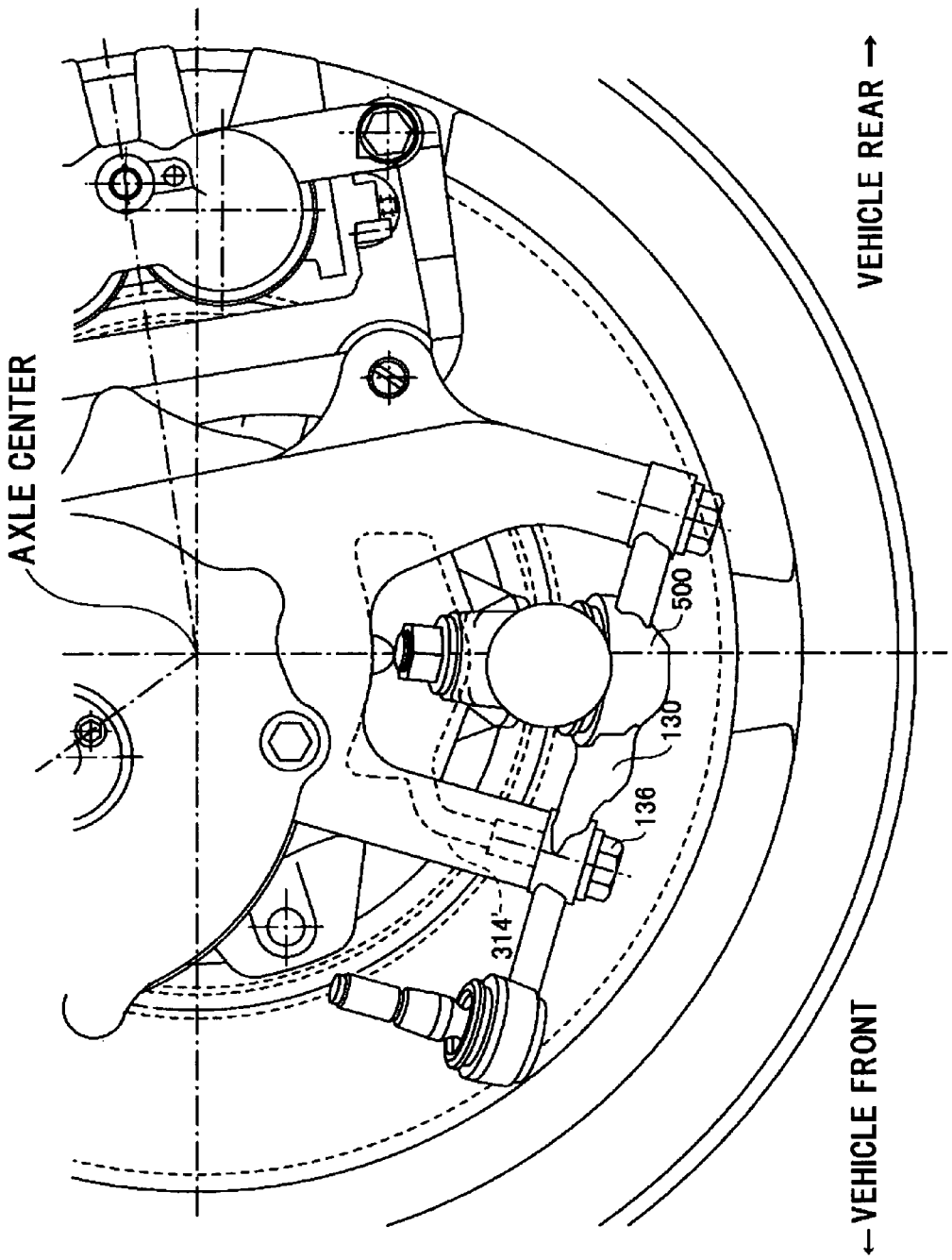
FIG. 5 is a view of another example arrangement of a drain plug.

FIG. 5 is a view of another example arrangement of the drain plug. In the example shown in FIG. 5, a drain flow path 314' is formed inside the front leg portion 426 of the knuckle 400 and has an opening at the lower end of the leg portion 426. The opening of the drain flow path 314' is blocked by a fastening bolt 136 of the knuckle arm 130. That is, in the example shown in FIG. 5, the drain plug also serves as the bolt 136 for fastening the lower ball joint 500 to the knuckle 400. This enables the number of parts to be reduced. Also, the drain plug is positioned lower than the lower ball joint 500 when the suspension is unweighted (see FIG. 4) so oil that can splash during an oil change will not get onto the lower ball joint 500, which makes it possible to reliably prevent a decline in performance of the lower ball joint 500 caused by oil that can splash during an oil change.

[Arrangement of the filler plug 340] The filler plug 340 is a removable plug that blocks the opening of a filler flow path 316 (only a portion of which is shown) of the oil tank 310, and can be removed when filling the oil tank 310 with new oil, such as when changing the oil, for example. The filler flow path 316 is formed so that it is communicated with the oil tank 310 inside the knuckle 400. In this example, the filler flow path 316 is formed in the vehicle width direction in a peripheral wall portion 430 of the knuckle 400, as shown in FIGS. 1 and 2. The filler flow path 316 has an opening on the vehicle inside surface of the inner peripheral portion 430, and the filler plug 340, which is liquid-tight, is attached to the opening.

The filler plug 340 is arranged farther to the vehicle inside than the lower ball joint 500, as shown in FIG. 2. Accordingly, even if oil that is being poured into the oil tank 310 leaks out while the filler plug 340 is removed when the oil tank 310 is being filled with oil, the leaked oil is prevented from getting onto the lower ball joint 500. Also, although the filler plug 340 is not arranged offset in the longitudinal direction of the vehicle with the respect to the lower ball joint 500, as shown in FIG. 1, it comes to be in a position offset forward with respect to the lower ball joint 500 when the suspension is unweighted, as shown in FIG. 4, which also prevents leaked oil from getting onto the lower ball joint 500 when filling the oil tank 310 with oil.

Also, the filler plug 430 is similarly arranged farther toward the vehicle inside than the brake dust cover 112, as shown in FIG. 2, which similarly prevents leaked oil from getting onto the brake disc 110 when the oil tank 310 is being filled with oil. As shown in FIG. 1, the filler plug 340 is arranged offset in the longitudinal direction of the vehicle with respect to the tie rod B/J 510, which similarly prevents leaked oil from getting onto the tie rod B/J 510 when the oil tank 310 is being filled with oil.

FIG. 6 is a sectional view of a wheel assembly with an in-wheel motor according to a modified example of the first example embodiment. This modified example differs from the foregoing example embodiment mainly in that in the example shown in FIG. 6 an oil tank 310B is completely housed within the space inside the hat portion 110a. In the illustrated example, the oil tank 310B is formed by a cover member 311 that is fixed to a knuckle 400B from the vehicle outside. The cover member 311 may be connected to the knuckle 400B by crimping or bolts or the like. According to this structure, the oil tank 310B is arranged completely offset in the vehicle width direction with respect to the lower ball joint 500. That is, the amount of offset in the vehicle width direction between the oil tank 310B and the lower ball joint 500 is greater than the amount of corresponding offset in the foregoing example embodiment. As a result, even in the unlikely event that oil does leak from the oil tank 310B due to the oil tank 310B being damaged or the like, the leaked oil will be reliably prevented from getting onto the lower ball joint 500, thereby reliably preventing a decline in performance of the lower ball joint 500. Also, the oil tank 310B is protected on the vehicle inside by the knuckle 400B which reduces the chances of the oil tank 310B becoming damaged by flying rocks or the like.

While example embodiments of the invention have been illustrated above, it is to be understood that the invention is not limited to details of the illustrated embodiments, but may be embodied with various changes, modifications or improvements without departing from the spirit and scope of the invention.

For example, in the example in the drawings, the reduction mechanism 200 realizes a two step reduction, but it may also realize a one or three or more step reduction. Also, the reduction mechanism 200 realizes the two step reduction using the counter gear mechanism 210 and the planetary gear set 220, but the invention is not limited to this. For example, the reduction mechanism 200 may instead realize the two step reduction using another combination such as two planetary gear sets that are connected in series.

Also, in the illustrated example, oil from the oil pump 300 is supplied to cool the motor 700 and lubricate the reduction mechanism 200. However, oil from the oil pump 300 may also be supplied only to the motor 700. Alternatively, oil from the oil pump 300 may be led to the brake caliper and used to generate hydraulic braking pressure.

Moreover, in the illustrated example, the counter gear mechanism 210 is such that the counter gear 214 is circumscribed on the driving gear 212 that is directly connected to the motor 700, thereby reducing the diameter of the main structure portion 410 of the knuckle 400 that surrounds the counter gear mechanism 210. However, the driving gear 212 may instead be inscribed in a larger diameter counter gear. That is, the structure may be such that teeth on the inner peripheral surface of the counter gear mesh with teeth on the outer peripheral surface of the driving gear 212.

Further, the illustrated example shows a wheel assembly with an in-wheel motor related to a steered wheel, but the invention can also be applied to a wheel other than a steered wheel.

Also, in the illustrated example, the motor 700 is arranged offset toward the vehicle front side with respect to the axle center. However, the motor 700 may also be arranged offset to the vehicle rear side with respect to the axle center, in which case the brake caliper 120 may be arranged toward the vehicle front side. Also, in the example in the drawings, the motor 700 is an inner rotor type motor, but it may alternatively be an outer rotor type motor.

Moreover, in the illustrated example, the drain plug 330 is arranged offset toward the front of the vehicle with respect to the lower ball joint 500. However, the drain plug 330 may also be arranged offset toward the vehicle rear side with respect to the lower ball joint 500. In this case, the drain flow path 314 may be formed in the rear leg portion 424 of the knuckle 400, and the drain plug 330 accordingly installed in the rear leg portion 424 of the knuckle 400.

Further, the example shown in FIG. 5 may also be realized in combination with the example shown in FIG. 1. That is, the drain plug may also be realized by both the drain plug 330 and the bolt 136.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

The invention claimed is:

1. A wheel assembly with an in-wheel motor, comprising:
   a motor for driving a wheel and which is arranged in the wheel;
   a reduction mechanism which reduces the rate of rotational output of the motor and transmits the resultant rotational output to the wheel;
   an oil tank in which oil collects;
   an oil pump that is driven by rotational output of the motor;
   an oil flow path that leads oil from the oil pump to at least one of the motor and the reduction mechanism;
   a brake disc;
   a brake dust cover that covers the brake disc from a vehicle inside in a vehicle width direction; and
   a lower ball joint that is connected to a wheel-side end portion of a lower arm of a suspension arm,
   wherein the oil tank is arranged below the reduction mechanism, closer to the vehicle inside than the brake dust cover, and closer to a vehicle outside in the vehicle width direction than the lower ball joint.

2. The wheel assembly with an in-wheel motor according to claim 1, wherein the brake disc includes a hat portion, and at least a portion of the oil tank is arranged inside the hat portion of the brake disc.

3. The wheel assembly with an in-wheel motor according to claim 1, wherein the oil tank is arranged on an inner radial side of an outer peripheral portion of the brake disc in the radial direction of the brake disc.

4. The wheel assembly with an in-wheel motor according to claim 1, wherein the oil tank includes a drain plug, and the drain plug is arranged offset in a vehicle longitudinal direction with respect to the lower ball joint.

5. The wheel assembly with an in-wheel motor according to claim 4, further comprising:
   a knuckle,
   wherein the oil tank includes a drain flow path for oil that includes an opening in the same position as the position where the lower ball joint fastens to the knuckle; the drain flow path is formed in the knuckles; and the drain plug also serves the fasten the lower ball joint to the knuckle.

6. The wheel assembly with an in-wheel motor according to claim 4, wherein the drain plug is arranged closer to the vehicle inside than the brake dust cover.

7. The wheel assembly with an in-wheel motor according to claim 4, wherein the drain plug is provided at the lowest position of the oil tank when suspension is unweighted.

8. The wheel assembly with an in-wheel motor according to claim 1, further comprising:
   a tie rod ball joint that is connected to a wheel-side end portion of a tie rod,
   wherein the oil tank includes a drain plug, and the drain plug is arranged offset in a vehicle longitudinal direction with respect to the tie rod ball joint.

9. The wheel assembly with an in-wheel motor according to claim 8, further comprising:
   a knuckle,
   wherein the oil tank includes a drain flow path for oil that includes an opening in the same position as the position where the lower ball joint fastens to the knuckle; the drain flow path is formed in the knuckle; and the drain plug also serves to fasten the lower ball joint to the knuckle.

10. The wheel assembly with an in-wheel motor according to claim 8, wherein the drain plug is arranged closer to the vehicle inside than the brake dust cover.

11. The wheel assembly with an in-wheel motor according to claim 8, wherein the drain plug is provided at the lowest position of the oil tank when suspension is unweighted.

12. The wheel assembly with an in-wheel motor according to claim 1, further comprising:
    a knuckle,
    wherein the oil tank includes a drain plug and a drain flow path for oil that includes an opening in the same position as the position where the lower ball joint fastens to the knuckle; the drain flow path is formed in the knuckle; and the drain plug also serves to fasten the lower ball joint to the knuckle.

13. The wheel assembly with an in-wheel motor according to claim 12, wherein the drain plug is arranged closer to the vehicle inside than the brake dust cover.

14. The wheel assembly with an in-wheel motor according to claim 12, wherein the drain plug is provided at the lowest position of the oil tank when suspension is unweighted.

15. The wheel assembly with an in-wheel motor according to claim 1, wherein the oil tank includes a drain plug, and the drain plug is arranged closer to the vehicle inside than the brake dust cover.

16. The wheel assembly with an in-wheel motor according to claim 1, wherein the oil tank includes a drain plug, and the drain plug is provided at the lowest position of the oil tank when suspension is unweighted.

17. The wheel assembly with an in-wheel motor according to claim 1, wherein the oil tank includes a filler plug, and the filler plug is arranged closer to the vehicle inside than the lower ball joint.

18. The wheel assembly with an in-wheel motor according to claim 1, further comprising:
    a tie rod ball joint that is connected to a wheel-side end portion of a tie rod,
    wherein the oil tank includes a filler plug, and the filler plug is arranged offset in a vehicle longitudinal direction with respect to the tie rod ball joint.

19. The wheel assembly with an in-wheel motor according to claim 1, further comprising:
    a lower ball joint cover that covers the lower ball joint from above.

20. The wheel assembly with an in-wheel motor according to claim 1, wherein an output shaft of the motor is arranged offset upward and forward with respect to an axle center.

* * * * *